United States Patent
Van Bael et al.

(10) Patent No.: US 9,618,215 B2
(45) Date of Patent: Apr. 11, 2017

(54) CONTROLLER FOR ENERGY SUPPLY SYSTEMS

(75) Inventors: Johan Van Bael, Westerlo (BE); Hans Hoes, Meerhout (BE); Fjo De Ridder, Brussels (BE)

(73) Assignee: VITO NV, Mol (BE)

( * ) Notice: Subject to any disclaimer, the term of this patent is extended or adjusted under 35 U.S.C. 154(b) by 332 days.

(21) Appl. No.: 13/061,223

(22) PCT Filed: Aug. 21, 2009

(86) PCT No.: PCT/EP2009/060815
§ 371 (c)(1),
(2), (4) Date: Feb. 28, 2011

(87) PCT Pub. No.: WO2010/023159
PCT Pub. Date: Mar. 4, 2010

(65) Prior Publication Data
US 2011/0166718 A1    Jul. 7, 2011

(30) Foreign Application Priority Data

Aug. 29, 2008 (EP) ..................................... 08163352
Dec. 24, 2008 (EP) ..................................... 08172941

(51) Int. Cl.
F24D 19/10 (2006.01)
F28D 20/00 (2006.01)
F28D 20/02 (2006.01)

(52) U.S. Cl.
CPC ......... *F24D 19/10* (2013.01); *F24D 19/1009* (2013.01); *F28D 20/0043* (2013.01);
(Continued)

(58) Field of Classification Search
CPC ......... F24D 19/10; F24D 19/1009; F24J 3/08; Y02E 10/10; Y02B 10/40
(Continued)

(56) References Cited

U.S. PATENT DOCUMENTS 4,050,509 A * 9/1977 Bienert et al. .................. 165/45
4,292,579 A * 9/1981 Constant ...................... 322/2 R
(Continued)

FOREIGN PATENT DOCUMENTS

CN    1237725 A    12/1999
DE    4404272      8/1994
(Continued)

OTHER PUBLICATIONS

Office Action from Canadian Intellectual Property Office for Canadian application No. 2,734,429, dated Nov. 19, 2012 (2 pages).
(Continued)

*Primary Examiner* — Mohammad Ali
*Assistant Examiner* — Kelvin Booker
(74) *Attorney, Agent, or Firm* — Bacon & Thomas, PLLC (57) ABSTRACT

The present invention relates to energy supply systems which comprise an energy storage unit and an energy production unit. Control methods according to the invention advantageously allow to calculate an operational cost of the energy supply system based on the energy flux that can be supplied by the system and the energy flux that is demanded externally from the system. The operational cost can be calculated for all possible values of the above parameters in advance. The calculated parameters can be stored in an array in a device implementing methods of the invention. Methods of the invention allow to operate an energy supply system so as to guarantee that at any instant a predetermined (nonzero) amount of energy flux can be supplied by the energy storage unit.

16 Claims, 4 Drawing Sheets (52) U.S. Cl.
CPC ....... *F28D 20/0052* (2013.01); *F28D 20/028* (2013.01); *Y02B 10/40* (2013.01); *Y02E 60/142* (2013.01); *Y02E 60/145* (2013.01)

(58) Field of Classification Search
USPC ...................................................... 60/641.2
See application file for complete search history.

(56) References Cited

U.S. PATENT DOCUMENTS

| | | | | |
|---|---|---|---|---|
| 4,373,573 | A * | 2/1983 | Madwed | 165/236 |
| 4,392,531 | A * | 7/1983 | Ippolito | 166/278 |
| 4,544,877 | A * | 10/1985 | Powell | 323/308 |
| 4,661,174 | A * | 4/1987 | Miyoshi et al. | 148/111 |
| 4,666,534 | A * | 5/1987 | Miyoshi et al. | 148/111 |
| 5,014,770 | A * | 5/1991 | Palmer | 165/48.2 |
| 5,020,596 | A * | 6/1991 | Hemsath | 166/272.3 |
| 5,082,055 | A * | 1/1992 | Hemsath | 166/59 |
| 5,477,706 | A * | 12/1995 | Kirol et al. | 62/480 |
| 5,547,341 | A * | 8/1996 | Amin | 415/143 |
| 5,765,387 | A * | 6/1998 | Amin | 62/401 |
| 5,924,486 | A * | 7/1999 | Ehlers | F24F 11/006 165/238 |
| 6,216,956 | B1 * | 4/2001 | Ehlers | F24F 11/006 236/47 |
| 6,340,787 | B1 * | 1/2002 | Simeray et al. | 136/201 |
| 6,393,775 | B1 * | 5/2002 | Staschik | 52/79.1 |
| 6,415,625 | B1 * | 7/2002 | Rockenfeller et al. | 62/476 |
| 6,532,426 | B1 | 3/2003 | Hooks et al. | |
| 6,538,883 | B1 * | 3/2003 | Greer | 361/679.47 |
| 6,757,591 | B2 | 6/2004 | Kramer | |
| 7,178,337 | B2 * | 2/2007 | Pflanz | 60/641.2 |
| 7,201,215 | B2 * | 4/2007 | Ippoushi et al. | 165/104.24 |
| 7,206,644 | B2 | 4/2007 | Iino et al. | |
| 7,347,057 | B1 * | 3/2008 | Garrabrant et al. | 62/148 |
| 7,566,980 | B2 * | 7/2009 | Fein et al. | 290/2 |
| 7,810,565 | B2 * | 10/2010 | Zubrin et al. | 166/266 |
| 7,856,317 | B2 * | 12/2010 | Schilling | 702/19 |
| 7,931,712 | B2 * | 4/2011 | Zubrin et al. | 48/197 R |
| 8,011,451 | B2 * | 9/2011 | MacDonald | 175/61 |
| 8,069,912 | B2 * | 12/2011 | Campagna et al. | 165/159 |
| 8,091,795 | B1 * | 1/2012 | McLellan et al. | 236/51 |
| 8,146,669 | B2 * | 4/2012 | Mason | 166/378 |
| 8,272,455 | B2 * | 9/2012 | Guimerans et al. | 175/17 |
| 8,286,441 | B2 * | 10/2012 | Simka | 62/250 |
| 8,536,497 | B2 * | 9/2013 | Kim | 219/544 |
| 2002/0082747 | A1 | 6/2002 | Kramer | |
| 2002/0149331 | A1 * | 10/2002 | Marcinkiewicz | 318/254 |
| 2003/0065560 | A1 * | 4/2003 | Brown et al. | 705/14 |
| 2004/0194929 | A1 * | 10/2004 | Ippoushi et al. | 165/104.29 |
| 2004/0216460 | A1 * | 11/2004 | Ruggieri et al. | 60/670 |
| 2005/0235232 | A1 * | 10/2005 | Papanikolaou et al. | 716/1 |
| 2005/0246039 | A1 | 11/2005 | Iino et al. | |
| 2005/0258154 | A1 * | 11/2005 | Blankenship et al. | 219/130.01 |
| 2006/0137349 | A1 * | 6/2006 | Pflanz | 60/641.2 |
| 2006/0253204 | A1 * | 11/2006 | Papanikolaou | G06F 17/5045 700/1 |
| 2007/0089861 | A1 * | 4/2007 | Ippoushi et al. | 165/104.24 |
| 2007/0240418 | A1 * | 10/2007 | Hargreaves | 60/641.2 |
| 2008/0148732 | A1 * | 6/2008 | Fein et al. | 60/641.3 |
| 2008/0148733 | A1 * | 6/2008 | Fein et al. | 60/641.7 |
| 2008/0149302 | A1 * | 6/2008 | Fein et al. | 165/45 |
| 2008/0149573 | A1 * | 6/2008 | Fein et al. | 210/799 |
| 2008/0150296 | A1 * | 6/2008 | Fein et al. | 290/1 R |
| 2008/0154801 | A1 * | 6/2008 | Fein et al. | 705/412 |
| 2008/0262820 | A1 * | 10/2008 | Nasle | G06Q 10/04 703/18 |
| 2008/0281473 | A1 * | 11/2008 | Pitt | 700/291 |
| 2009/0063122 | A1 * | 3/2009 | Nasle | G05B 23/0235 703/18 |
| 2009/0065255 | A1 * | 3/2009 | Roussy | 175/56 |
| 2009/0076749 | A1 * | 3/2009 | Nasle | G05B 17/02 702/62 |
| 2009/0083019 | A1 * | 3/2009 | Nasle | G06F 17/509 703/18 |
| 2009/0093916 | A1 * | 4/2009 | Parsonnet et al. | 700/286 |
| 2009/0189617 | A1 * | 7/2009 | Burns et al. | 324/649 |
| 2009/0194269 | A1 * | 8/2009 | Vinegar | 166/60 |
| 2009/0194282 | A1 * | 8/2009 | Beer et al. | 166/272.7 |
| 2009/0194286 | A1 * | 8/2009 | Mason | 166/302 |
| 2009/0194287 | A1 * | 8/2009 | Nguyen et al. | 166/302 |
| 2009/0194333 | A1 * | 8/2009 | MacDonald | 175/45 |
| 2009/0194524 | A1 * | 8/2009 | Kim | 219/544 |
| 2009/0200023 | A1 * | 8/2009 | Costello et al. | 166/260 |
| 2009/0200025 | A1 * | 8/2009 | Bravo | 166/265 |
| 2009/0200290 | A1 * | 8/2009 | Cardinal et al. | 219/488 |
| 2009/0200854 | A1 * | 8/2009 | Vinegar | 299/5 |
| 2009/0220220 | A1 * | 9/2009 | Bilodeau | 392/341 |
| 2009/0301687 | A1 * | 12/2009 | Watts | 165/48.2 |
| 2009/0308566 | A1 * | 12/2009 | Simka | 165/45 |
| 2009/0309408 | A1 * | 12/2009 | Bishop | 299/5 |
| 2010/0012740 | A1 | 1/2010 | Paulus et al. | |
| 2010/0138062 | A1 * | 6/2010 | Zheng et al. | 700/291 |
| 2010/0154855 | A1 * | 6/2010 | Nemir et al. | 136/205 |
| 2010/0155141 | A1 * | 6/2010 | Roussy | 175/56 |
| 2010/0252647 | A1 * | 10/2010 | Ace | 239/2.1 |
| 2010/0288555 | A1 * | 11/2010 | Foppe | 175/11 |
| 2010/0305918 | A1 * | 12/2010 | Udell | 703/2 |
| 2011/0000638 | A1 * | 1/2011 | Fein et al. | 165/45 |
| 2011/0040417 | A1 * | 2/2011 | Wolfe et al. | 700/291 |
| 2011/0167819 | A1 * | 7/2011 | Lakic | 60/641.2 |
| 2012/0198847 | A1 * | 8/2012 | Circeo et al. | 60/676 |

FOREIGN PATENT DOCUMENTS

| | | |
|---|---|---|
| EP | 0999418 | 5/2000 |
| EP | 1729071 | 12/2006 |
| EP | 1764562 | 3/2007 |
| EP | 2146309 | 1/2010 |
| GB | 1553268 | 9/1979 |
| GB | 1553268 A | 9/1979 |
| JP | 2002-0364901 A | 12/2002 |
| JP | 2003-002089 A | 1/2003 |
| JP | 2003-050037 A | 2/2003 |
| JP | 2006-292310 | 10/2006 |
| JP | 2007-032913 B1 | 1/2007 |
| TW | 539932 B | 7/2003 |
| WO | 2007/090400 | 8/2007 |
| WO | 2009062032 | 5/2009 |

OTHER PUBLICATIONS

Partial International Search Report in PCT/EP2009/060815, Nov. 5, 2010.
International Search Report (Extended) and Written Opinion in PCT/EP2009/060815, Mar. 1, 2011.
Office Action issued in JP 2011-524332, dated Jun. 4, 2013, and English translation thereof.
Chinese Office Action for CN 200980134282.1, dated May 22, 2013, and English translation thereof.
European Office Action for EP 08172941.0, dated Aug. 8, 2013.
Canadian Office Action in corresponding Canadian application CA 2734429 dated Aug. 27, 2013.
Chinese Office Action dated Feb. 13, 2014, for CN 200980134282.1, and English translation thereof.
Japanese Office Action dated Mar. 3, 2015, for JP 2014-076768, and English translation thereof.
Japanese Office Action dated Nov. 17, 2015, for JP 2014-076768, and English translation thereof.

\* cited by examiner

CONTROLLER FOR ENERGY SUPPLY SYSTEMS

FIELD OF THE INVENTION

The present invention is related to methods of and devices for operating and controlling energy supply systems, in particular systems which comprise an energy storage unit and an energy production unit.

Energy storage units may store some form of energy for subsequent release. They may store, e.g. thermal, mechanical, chemical, gravitational or electrical energy. They can be, for example, batteries; alternatively they may store e.g. thermal energy and be, for example, thermal energy storage systems based on phase change materials or underground thermal energy storage systems.

Energy production units may use, for example, fossil fuels, electricity, or renewable energy sources (e.g. solar energy, wind, water, environmental heat or cold captured in building rooms) to produce energy. Examples of energy production units are: gas heater for a building or diesel engine for a vehicle.

Such energy supply systems combining the energy released by an energy storage unit and the energy directly produced by an energy production unit may be used, for example, for running a vehicle and for heating and/or cooling buildings.

STATE OF THE ART

As one form of energy storage unit, thermal energy storage systems may comprise a medium for storing thermal energy, which can store the thermal energy for a defined time period. The thermal energy may be heat and/or cold.

A particular application is formed by underground thermal energy storage systems (UTESS), which comprise a large underground volume that may store a huge amount of thermal energy. If such a system is loaded with excess heat during summer and with cold during winter, it may be capable of air conditioning a building year round. In essence it may shift the cold and heat between the seasons.

An underground storage field may for example comprise about one hundred boreholes, drilled in a square or circular mesh. Each borehole may be about 120 m deep. Each borehole may comprise a loop circuit for a liquid, which acts as carrier of thermal energy (e.g. water). The borehole may further be filled with a grouting material (e.g. bentonite) having a good thermal conductivity. Each borehole hence may form an underground heat exchanger between the carrier liquid and the underground material.

Underground thermal energy storage systems may be used for heating and cooling of buildings, particularly large office buildings. In winter, a heat pump may extract heat from the field and warm it up to approximately 40° C. at low energy costs and high energy efficiency. In summer, the low temperature of the underground field may be used for cooling purposes.

Underground thermal energy storage systems may reduce the cost of heating and cooling of such buildings and may furthermore help in reducing carbon dioxide emissions.

Underground thermal energy storage systems may mostly complement the classical heating and air conditioning systems (such as gas heating and electrical cooling), which are, in this embodiment, the energy production units, so as to reduce the operational cost of air conditioning.

However, the thermal energy stored in such underground fields is finite. Therefore, measures have to be taken in order to avoid exhausting the underground field, so as to allow smooth operation the whole year round. If the underground field temperature becomes higher than a predetermined temperature, for example 12° C., it may be too warm for cooling a building. Similarly, supplying heat may become more expensive if temperature of the underground field drops beneath a predetermined temperature, for example 0° C.

Patent application JP 2006-292310 discloses an underground thermal energy storage system wherein limit values of the temperature of the underground field are set such that the underground temperature can be prevented from becoming too high or too low so as to disable the operation. When the limit value of the field temperature is attained, the operation is suspended in order to allow recovery.

However, when operation of the UTESS is suspended, the classical heating/air conditioning (HAC) equipment has to supply the full thermal energy for air conditioning the building. This leads to an increased economical cost of operation. Moreover, the classical HAC equipment has to be designed in order to be able to supply the whole amount of thermal energy demand, resulting in large and expensive systems.

As another form of energy storage unit, batteries may store energy that can be converted into electric energy. They may be used in combination with, for example, fossil fuel motor such as a petrol or diesel or biodiesel engine, i.e. an energy production unit as herein defined, for example in a car. In this particular embodiment, if the batteries are fully used in the course of a journey, the engine needs to be designed in order to ensure the whole amount of energy required by the car to end the journey, resulting in powerful and expensive engines.

Aims of the Invention

The present invention aims to provide methods of and devices for controlling energy supply systems that overcome drawbacks of prior art methods and devices. In particular, one aim of the invention is to provide such methods and devices which guarantee continuous operation of the energy storage units.

An additional or alternative aim of the invention is to provide methods of and devices for operating energy supplying systems that reduce the overall operational cost.

Another additional or alternative aim of the invention is to provide methods of and devices for controlling energy supply systems that allow to design more compact energy supply systems.

SUMMARY OF THE INVENTION

At least one aim of the invention is met by providing methods of operating energy supply systems as set out in the appended claims.

Control methods according to the invention advantageously allow to estimate or calculate an operational cost of the energy storage unit, under given control conditions, for example the energy that can be supplied by the unit and the energy that is demanded externally from the system. The operational cost may be calculated for all possible values of the above or other parameters in advance. The calculated parameters may be stored in an array in a device implementing methods of the invention. In the case of an underground thermal energy storage system, another condition may lie in the optimal range of temperatures in which the system may work.

In some embodiments, methods of the invention allow to operate an energy supply system so as to guarantee that at any instant a predetermined (nonzero) amount of energy can be supplied by the storage unit.

Other aims of the invention may be met by providing devices for controlling energy supply systems as set out in the appended claims.

BRIEF DESCRIPTION OF THE DRAWINGS

All the figures relate to a specific embodiment where the energy storage unit is an underground thermal energy storage system.

DETAILED DESCRIPTION OF THE INVENTION

The invention is in general related to all kinds of systems for energy supply including an energy storage unit and an energy production unit. Examples of energy storage units include thermal energy storage systems in cars, such as for maintaining the car engine cooling fluid within a desired temperature range (e.g. for car engines that frequently make a start/stop), in computers for the cooling of microprocessors, in tooling machines; Other examples of energy storage units include batteries, such as a battery in a car which may be charged, for example, by a dynamo on braking or for pump storage schemes in combination with power stations such as nuclear power stations. Various types of energy storage systems and methods, e.g. thermal, mechanical, chemical or electrical energy storage methods and systems, are included within the scope of the invention.

The present invention will be exemplified with reference to underground thermal energy storage systems and one particular embodiment of the present invention is in underground thermal energy storage systems. The invention is not limited thereto. Preferred embodiments of this aspect of the invention are described hereinafter in the field of underground thermal energy storage systems.

A global HAC system of a building may comprise two blocks: firstly, as energy production unit, a classical heating/cooling installation, comprising a gas fired boiler and an electricity consuming chiller, and secondly, as energy storage unit, an underground thermal energy storage system, comprising an underground field, coupled to a heat exchanger and heat pump.

During winter, mostly heat is extracted from the field. This cools the field and thus prepares it for the summer, when mostly cooling will be demanded. During summer, the opposite scenario takes place.

A typical underground storage field may be designed so that a predetermined amount of thermal energy (heat/cold) can be delivered during each season. However, this may only be guaranteed if no temperature bounds are ever trespassed. So, a first property of control methods/devices of the invention may be to keep the field within a given temperature range. The temperature range may vary in function of time (week, month, season, etc.)

Two other complications are preferably to be taken into account.

(i) Weather changes can make predicting the thermal energy demand of a building on a daily or weekly basis a hard task to perform. Only on a seasonal scale, a reasonable estimation of the needs may be provided. For that reason, a second property of control methods/devices of the invention is that they are preferably able to deal with stochastic variations on the demand side.

(ii) A preferred third quality is that control methods/devices of the invention can adjust the building's temperature at the lowest cost possible. This may be done by optimizing the choice between the classical HAC installation and the heat pump coupled to the storage field.

According to the knowledge of the inventors, a number of possible algorithms seem suited for this purpose amongst which are convex optimization algorithms or indirect methods, nonlinear model predictive control and dynamic programming. Present embodiments illustrate an implementation of the latter algorithm, because it has the advantage that all computations may be performed off-line, i.e. in advance, before the control method/device is made operational. This may facilitate the actual installation of the control method/device a lot: no strong computer power may be needed onsite and less starting problems may occur in case of a power breakdown.

Control methods and devices according to the invention thus preferably allow to install an HAC installation comprising a smaller underground field and a smaller classical installation compared to the prior art. Still, they may guarantee to supply the required heat and cold.

Surprisingly, under certain conditions control methods/devices of the invention may extract heat or cold from the field, even if this is not demanded by the building. As will become clear, such an operation strategy may be the economically most efficient way of heating/cooling.

An implementation example of a control method according to the invention is set out hereinafter. Firstly, a model for the underground is selected. This model enables the prediction of underground temperature changes due to a given operation strategy. A relatively simple model can be used for describing the dynamics of the underground storage system, such as a first order response model:

$$mc\dot{x} = f(x, u)$$
$$= \lambda(T_\infty - x)u'$$

with x the mean temperature of the field (° C.), $\lambda$ the thermal conductivity (J/s/° C.), $T_\infty$ the undisturbed boundary temperature (11° C.), i.e. the temperature of the ground far from the field, m the mass (kg), c the heat capacity (J/kg/° C.) and u the amount of heat extracted per time unit (J/s). This equation has two unknowns (mc and $\lambda$). The first is a measure for the amount of heat that can be stored. This capacity should be sufficiently large, so that enough heat can be loaded. The thermal conductivity should be sufficiently low, so that large time lags can be achieved. This combination of large capacity and low conductivity allows the system to shift large amounts of excess heat from summer to winter season and vice versa.

Figure 1:
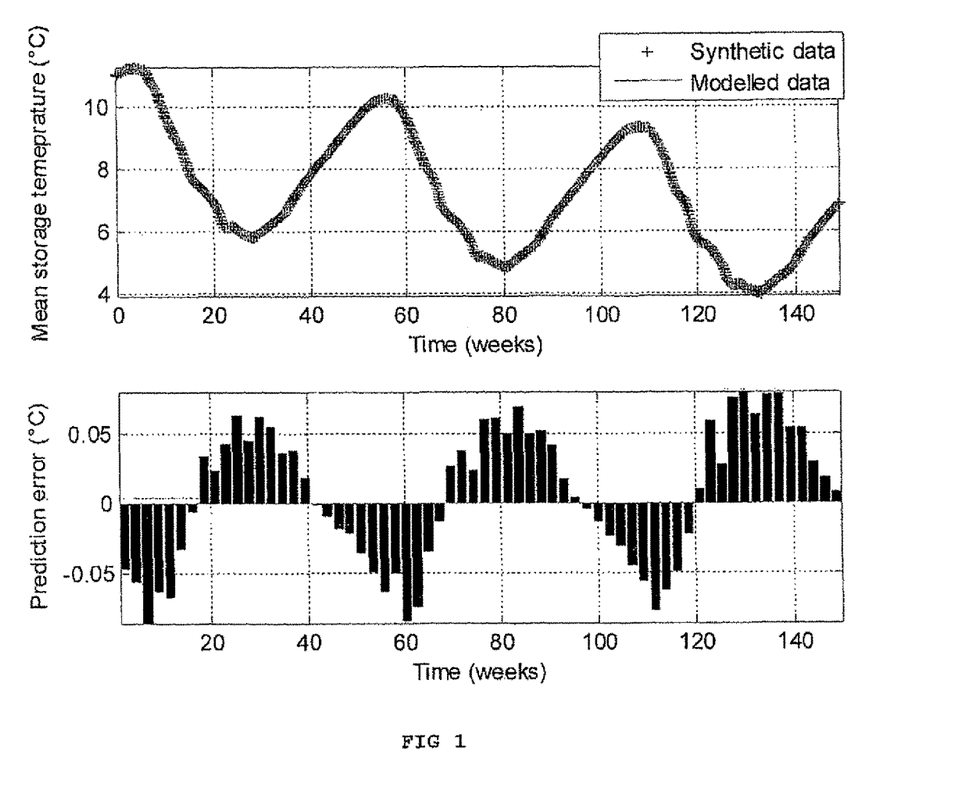
FIG. 1 represents in the uppermost plot synthetic data and model values for an example. In the lower plot, the prediction error is shown.

Both unknown parameters can be estimated starting from synthetic data generated by a simulation of the underground system (e.g. in TRNSYS). As a model for the underground to optimize the parameters mc and λ the Duct Ground Heat Storage Model can be used. The results are visualized in FIG. 1. The sinusoidal structure in the error is due to simplification of the model and can further be reduced by increasing the model complexity, e.g. by introducing second order effects. However, since the root-mean-square value of the prediction error is only 0.0485° C. with maximum deviation of 0.0857° C., it may be concluded that this simple model is sufficiently good for implementation in a controller/control method. In addition, the error is positive during winter and negative during summer. This means that the real temperature is higher in winter and lower in summer. Consequently, a control method/device would act more prudent than strictly necessary.

Further, constraints are implemented in the above example control method. A first constraint can concern the pumps used to circulate the carrier liquid through the underground storage system. The pump flow rate is limited to 78 m³/h in the present example, corresponding to a heat flux of 343 kW (temperature difference is set at 4° C., the carrier liquid is a mixture of water and antifreeze, with a heat capacity of 3.95 J/kg/° C.). If larger pumps would be installed, pressure drops will become important and consequently a lot of energy would be wasted. So, $$h_1 = u - 343 \text{ kW} < 0$$

$$h_2 = -u - 343 \text{ kW} < 0$$

wherein u stands for the thermal energy flux out of the field. If u is positive heat is extracted, otherwise cold is extracted. The symbol u is selected, because this symbol is usually used as control variable.

A second set of constraints bounds the temperature of the field. The space between the ground and the pipes is filled with grouting material, which is a good heat conductor. However, when it freezes, the risk exist that cracks occur in this grouting material, which result in a lower conductivity (irreversible process). For that reason, the temperature of the underground field should preferably not fall below freezing point (0° C.). At the other edge, it becomes almost impossible to cool a building if the temperature of the field becomes too high. Preferably, the upper limit falls in the range between 10° C. and 15° C. In the present example, the upper limit of the underground field temperature is set at 12° C. So, $$h_3 = -x < 0$$

$$h_4 = x - 12 < 0$$

with x the temperature of the underground field (this symbol is selected, because it is the state space variable).

Furthermore, a certain amount of thermal energy flux should be guaranteed during the seasons. This enables to correctly dimension the additional classical HAC installation. In principle, any function for guaranteed heat or cold supply may be chosen:

Heat supply: $h_5 = -u + f(\text{time}) < 0$

Cold supply: $h_6 = u - g(\text{time}) < 0$, with $f(\text{time})$ and $g(\text{time})$ arbitrary functions of time. In the present example, a rather simple function has been used. A time frame of one year is selected. The time frame is divided in a winter and a summer season. During winter, defined as the period from October 1st to March 31st, the underground system should be able to deliver continuously 200 kW heat, if desired. During the summer (April 1st to September 30th), the underground system should be capable of supplying the same amount of cold, if desired.

winter: $h_5 = -u + \min(q, 200) < 0$ summer: $h_6 = u - \max(q, -200) < 0$ wherein q represents the thermal energy flux (power) demand from the building. If the demand of thermal energy from the building is lower than 200 kW, only the demand q, can be delivered. However, if more is needed, the field is only obliged to supply 200 kW. The rest can come from the classical HAC installation, from the field or from both. The choice is balanced towards minimum energy costs.

The two latter equations may be replaced by other forms of defining the user demands. Even though the control policy will be altered, the same framework can still be applied. All of these constraints can affect the final control policy.

Model and constraints as identified above can be implemented in a dynamic programming algorithm. The dynamic programming algorithm subdivides all variables: the time is subdivided so that the controller is evaluated at predetermined time instants (steps), e.g. once a week; the demand and delivered heat/cold are divided e.g. in 11 steps between −343 and 343 kW and the temperature is divided e.g. in 105 steps between 0 and 12° C.

The algorithm comprises three blocks, which are recursively repeated.

Figure 2:
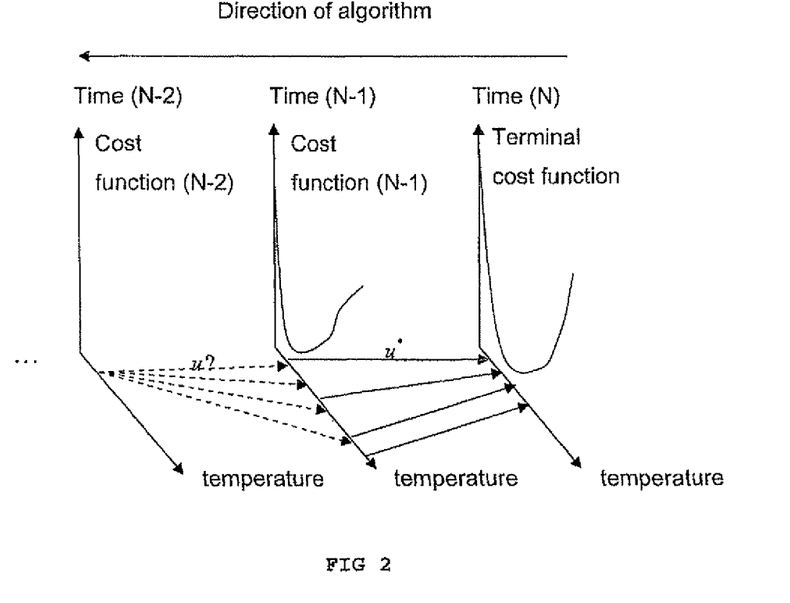
FIG. 2 represents an example of a dynamic programming algorithm.

Firstly, a terminal cost function is defined. This function can be regarded as an initialisation of the algorithm and couples a cost to every temperature. The terminal cost function is shown at the right side of FIG. 2 for the time period number N. The terminal cost function assigns a cost to each value related to the energy stored, e.g. temperature at the terminal or last time point of a cycle. Then by working backwards in time it is possible at each time interval to define a new cost function at each previous time interval, e.g. N−1, N−2 etc. Secondly, to determine the cost function at an earlier time, the algorithm selects the optimal heat flux u* for every value related to the energy stored, e.g. temperature for the previous week (time instant N−1), i.e. that flux which leads to the lowest cost. This is illustrated by the arrows between the middle plot and right plot on FIG. 2. This cost consists of the terminal cost and the costs made if the system is operated under the optimal control parameter u*. Note that the value of the control parameter varies with temperature. Thirdly, these optimal costs for every temperature result in a new cost function at time period N−1, which can be used to find the optimal control parameters for the previous week. This procedure can be repeated for each earlier time period, N−2, N−3, . . . until the optimal controller is found for all temperatures of all weeks.

All that needs to be stored is the cost functions as determined at each time point. In order to find the optimal control parameter for a given temperature and time in the present example, all possible values are evaluated as shown by the dotted arrows in FIG. 2. Those values, which result in a violation of a constraint are eliminated. From the remaining set, that value corresponding to the lowest cost is selected. This procedure can guarantee that no constraint is ever violated and that an optimal control parameter is selected, whatever state the system is in.

In the present example, the implemented control method ends the last day of winter. As stated previously, an aim of the terminal cost function is to associate a cost to each temperature on that (final) day. This can be done in two steps. First an initial guess is made; next, the algorithm is iterated over several years to converge to a better terminal cost function. In order to find an initial guess, it can be argued that in the upcoming summer, the field is used to supply cold. For that reason, it would be beneficial if the ground is as cold as possible. The initial terminal cost function can simply be proportional to the final temperature $x_N$, $$E_{initial}(x_N) \propto x_N.$$

In order to minimize the error in the control law due to this simplification of the terminal cost function, the dynamic programming algorithm can be run over several years. Each time the cost function of April 1st is calculated, this function is used as an improved estimation of the terminal cost. After a limited number, e.g. a couple of iterations, a convergence can be obtained. In addition, proof can be found that it converges to the true terminal cost function.

Further, a stage cost L can be calculated. The time frame is subdivided in steps of one week. The stage or cost-to-go function tells us the cost if the system is operated under a given control condition. This stage or cost-to-go function itself is function of the temperature of the field and of the selected operation conditions: demanded and supplied heat/cold, respectively g and u. An overview of a cost-to-go function is given in table 1.

TABLE 1 stage cost or cost-to-go function.

| L(u, q) | u > 0 | u < 0 |
|---|---|---|
| q > 0 | $\frac{k_K}{\eta_K}\max(q-u, 0) + \frac{k_E}{COP_K}u$ | $\frac{k_K}{\eta_K}q$ |
| q < 0 | $\frac{k_E}{COP_E}|q|$ | $\frac{k_E}{COP_E}\max(|q|-|u|, 0)$ |

If heat is demanded (q>0) and the field is supplying heat (u>0), the cost consists of two terms: that part which is not supplied by the field has to be produced by the classical installation, e.g. a boiler. For this term, we take the gas price $k_K$, and the efficiency $\eta_K$ into account. The second term contains the electrical costs of the heat pump and its coefficient of performance $COP_K=3.75$.

If heat is demanded and no heat is supplied (q>0, u≤0), all heat has to come from the classical installation. If cold is demanded and no cold is provided (q<0, u≥0), the cooling installation has to supply it at a relative high cost. Finally, if cooling is demanded and supplied (q<0, u<0), only that part not supplied by the field has to be supplied by the classical installation.

Note that if more heating or cooling is supplied than needed, this excess is lost free of charge. During summer, it is probably quite easy to heat the field, but under certain conditions during winter, the outside temperature might be too high to cool the field free of charge. However, this will largely depend on the situation and is ignored in the present example.

A mathematical formulation of the dynamical programming algorithm as identified above is discussed hereinafter. The optimal control parameters are given by:

$$u_k^*(x_k, q_k) = \operatorname*{argmin}_{u_k} J_k^+(u_k, x_k, q_k)$$

subject to $h < 0$ with $J_k^+(u_k, x_k q_k) = L(u_k, q_k) + J_{k+1}(f(x_k, u_k))$ The $u^*_k(x,q)$ refers to the control policy. Its value tells us the optimal amount of thermal energy flux that can be extracted from the field in a certain week k for a given mean temperature x and a demanded amount of thermal energy flux q. Its value can be calculated by scanning all possible values for u within the constraints $h_1$ and $h_2$, eliminating all solutions which violates constraints $h_3$ to $h_6$ and selecting that value which minimizes the cost. This cost can be calculated as follows:

$$J_k(x_k) = \operatorname*{E}_{q_k} \left\{ \min_{u_k} J_k^+(x_k, u_k, q_k) \right\}$$

wherein the right hand side is the cost averaged out over all q's (demanded heat in the future). This averaging procedure uses a distribution of the expected demanded thermal energy flux. In practice this means that no weight is given to a situation where heat is demanded in mid-summer if this is very unlikely.

Figure 3:
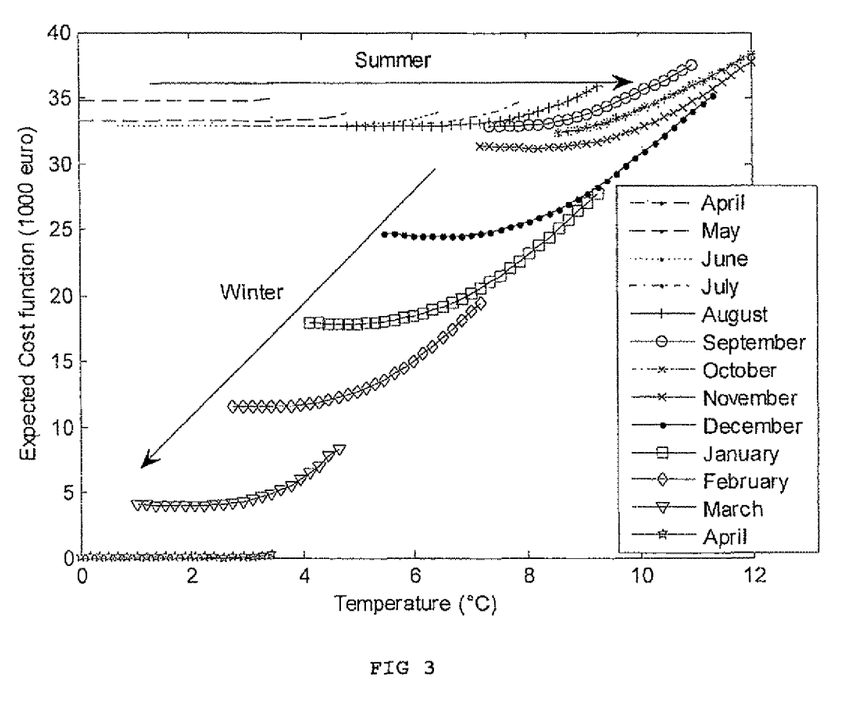
FIG. 3 represents a simulated evolution of the cost function.

In FIG. 3 a simulated evolution of the cost function as function of time and temperature is shown. To interpret this figure, start at the line on the left top corresponding to month April. This line is the expected cost needed to air condition the office building until April next year. If the underground field is warmer than 4° C. no cost function is shown, because for such high temperatures, the field cannot guarantee that it can deliver 200 kW cold all summer long. The next month the temperature range has shifted to higher temperatures. The reason for this is that if the temperature would be too close to zero, the field cannot guarantee to deliver 200 kW heat in the approaching winter. By the end of summer the temperature has risen above 10° C., ready to supply heat during the winter. During the winter season the opposite is true: the field is cooling down.

It can be noted from FIG. 3 that during the summer season the cost function is rather flat, which means that a difference in temperature will hardly affect the cost, while in winter the temperature is much more critical. When cold is extracted from the field, it is delivered free of charge to the office building, while if heat is extracted, it has to be upgraded, which is costly. This causes that most expenses can be expected in winter.

FIG. 3 indicates the expected terminal cost for operation to April of the next year. As can be seen, during the winter seasons, highest decrease in terminal cost can be expected.

Figure 4:
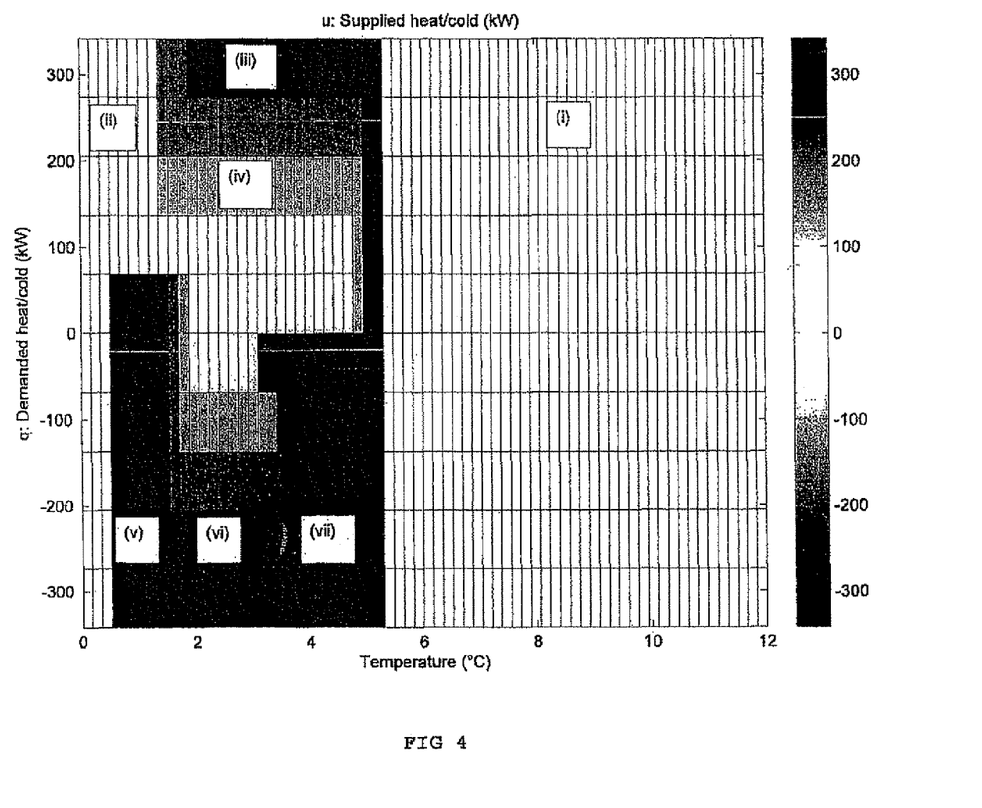
FIG. 4 represents a simulated control law for a week in February. White indicates constraints are violated.

For a particular week in February, a simulated control policy is shown in FIG. 4. At this moment of the year, the aim can be to cool down the field in order to provide cooling during summer. At the same time, the field should preferably provide the demanded heating with a maximum of 200 kW. In FIG. 4, seven regions can be identified, as discussed hereinafter.

(i) If the temperature is above 5.3° C., the field will not be able to provide 200 kW cooling during the complete summer season. So constraint $h_6$ is violated.

(ii) If the temperature is below 1.3° C., the field cannot guarantee to provide 200 kW for the remaining winter season. So in this region constraint $h_5$ is violated.

(iii) If 300 kW heating is demanded, the provided amount depends on the field temperature. Between 1.3 and 1.9° C.

only the guaranteed 200 kW is supplied, above 1.9° C., the demanded 300 kW is provided. If the field's temperature is between 5.1 and 5.3° C., the 300 kW can still be supplied, but it is more beneficial to extract 343 kW and drain the 43 kW excess heat. If no action is taken, it will become impossible to guarantee a cooling of 200 kW cooling during the next summer.

(iv) If less than 200 kW is demanded, at least this amount is provided, so no constraints are violated. However, if the temperature of the field rises above 5.0° C., it is beneficial to extract more heat than demanded by the building. This excess has to be drained.

(v) If cold is demanded in this period of the year, no minimum deliveries are promised, so the controller is free to optimize the field's temperature. Between 0.5 and 1.5° C., the field is actually too cold and additional heat is supplied to the field. This drives the field toward more optimal temperatures.

(vi) Between 1.5 and 3.6° C. the temperature is optimal and the demanded cold is supplied.

(vii) If the temperature would be above this 3.6° C., it is most beneficial if heat is extracted and drained, while the classical installation is providing the demanded cold. The reason for this action is that the field is actually too cold and if no action is taken, it will become impossible to provide 200 kW heating during the coming winter.

Figure 5:
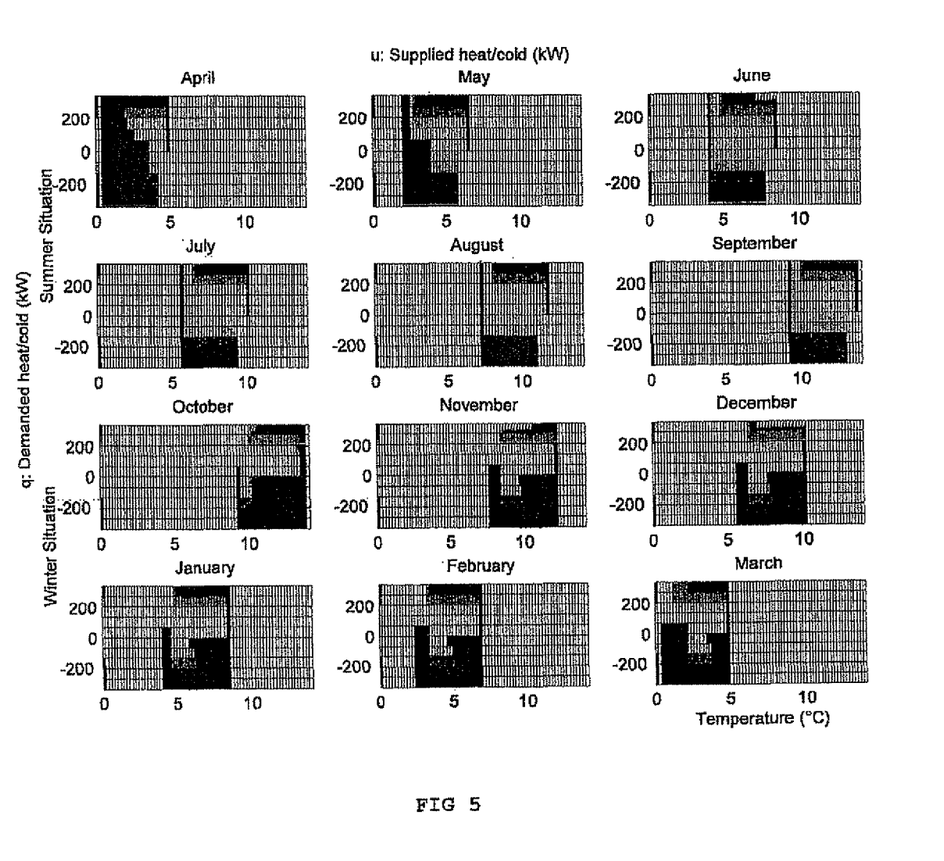
FIG. 5 represents a simulated evolution of the thermal energy flux supplied by an underground thermal energy storage system when a control method of the invention is implemented.

In FIG. 5 the selected control parameter (thermal energy flux supplied) is shown for a typical week in every month of a year. Here can be seen that during the summer period, the system is mostly forced to heat up by extracting cold if the temperature is too low. This is most pronounced in spring, where one can see the large vertical blue bands in FIG. 5. Only when the field is too warm, heat is extracted, but this is rather rare. Towards the end of summer, the field is relatively warm and mostly the demanded heat is supplied. In winter, the opposite scenario takes place: the field is forced to cool down by extracting heat.

A succession of the control parameter may guarantee that the temperature remains in its desired range all year long. Depending on the demand, the optimal amount of energy extracted from or supplied to the field may vary slightly. At any time during summer at least 200 kW cold is supplied if demanded and during winter 200 kW heat can be delivered. Under these operating conditions it is impossible that the underground field temperature may fall below 0° C. or heat above 12° C. Above all, the heating and cooling may be partitioned between a classical installation and an underground storage field, so that the total cost may be minimized.

The implementation of control methods/devices of the invention may be complemented with a measurement method/device for measuring the (average) temperature of the field. This may be measured by inserting a temperature sensor in the ground at several distances from the boreholes. The average value of the sensors may probably be a good measure for this parameter. An alternative may be utilizing the carrier liquid temperature after a shut down for one or two days. Often office buildings are not used during the weekend and after such a period the carrier liquid temperature may be quite close to the mean field temperature.

An advantage of the dynamic programming approach according to the invention is that the final outcome is a large array, which may easily be stored in a small computer, which may be already present to apply the current, classical, control policy. Model predictive control algorithms, which could result in similar controllers would need a more powerful computer to estimate the optimal control value for the system.

But the invention is neither limited to these previously described embodiments, nor to that field of application.

Another particular application is in battery energy storage systems. Preferred embodiments of such aspect of the invention are described hereinafter in relation to an energy supply system for a car or other vehicle.

An energy supply system for a car may comprise two blocks: firstly, as energy production unit, a petrol engine, and secondly, as energy storage unit, a battery. As for the building global HAC system of the previous example, a model and constraints may be here defined and implemented into a dynamic programming algorithm. The model describes the battery functioning and may take account inter alia its capacity, and the amount of energy it can release to the system per time unit. Constraints may include, for example, the battery capacitance, the time needed to charge the battery, the speed at which the battery can release the stored energy to the system; the additional constraint that a certain amount of energy should be guaranteed during the whole car journey, may be taken into account.

Here also the algorithm may comprise three blocks, which may be recursively repeated. The terminal cost function initialises the algorithm and couples a cost to, for example, each voltage of the battery. The voltage of the battery may be an indication of the energy contained within the energy storage unit i.e. the battery. The control device may be coupled to: a GPS system where any journey may be predetermined or a recurring journey, for example a home-work-home daily itinerary may be stored. This may determine the time frame. Secondly, the algorithm may select the optimal energy flux for every possible voltage of the last similar journey, i.e. that flux which leads to the lowest cost. Thirdly, these optimal costs for every voltage may result in a new cost function, which can be used to find the optimal control parameters for the previous and future voltages. Also a further constraint may be placed upon the system. For safety reasons, the battery should be able to deliver a certain amount of energy as a minimum at any time. This would be required to accelerate from standstill across a road junction, overtake a vehicle or carry out an emergency action. This constraint is analogous to the constraint on the heat storage system to be able to deliver a minimum energy at any time.

Control methods and devices according to the invention may thus allow installation in the car an energy supply system comprising a smaller petrol engine than would otherwise be required. They may nevertheless guarantee supply of the required or desired amount of energy.

It may be advantageous to arrive at destination having used substantially all battery power, so that the recharging operation may be more efficient. This may be a further constraint that could be taken into account if desired.

A further embodiment of the present invention relates to a pump storage system combined with one or more power stations. Particularly, if the power station is a nuclear power station, its power output can only be changed slowly. For rapid power changes during the day, a pumped water storage scheme can drive a turbine to generate the necessary electricity. At the end of the day the upper reservoir should be depleted almost fully so that at low power usage at night the unused power from the nuclear power stations can be used to pump the water to the higher reservoir using lower cost night tariff electricity. If the upper reservoir is too full at the end of the daytime, then less low price energy can be used from the power stations to increase the level in the upper reservoir.

Also in this embodiment a further constraint may be placed upon the system. To prevent a blackout, the pump storage system should be able to deliver a certain amount of energy as a minimum at any time as the nuclear power stations cannot react quickly. If this emergency power is not available there is a danger that the phase timing of the AC power will go out of synchronisation and generators will drop out in a domino effect. This constraint is analogous to the constraint on the heat storage system to be able to deliver a minimum energy at any time.

Control methods and devices according to the invention may thus allow use with a pump storage energy supply system comprising a pump storage scheme that can guarantee supply of the required or desired amount of energy at an optimum cost while maintaining security requirements.

Other embodiments of the invention may be defined as follows:

A method of operating an energy storage device, e.g. a thermal, mechanical, chemical or electrical energy storage device, said energy storage device storing an amount of energy, e.g. thermal, mechanical, chemical or electrical energy that is dependent upon a value related to the amount of energy stored in the energy storage device, e.g. dependent on the temperature of said thermal energy storage device, the method comprising the steps of:

selecting a constraint energy flux, e.g. thermal, mechanical, chemical or electrical energy flux, which said energy storage device is guaranteed to supply at predetermined time instants in a predetermined time frame, predetermining a profile range of the value related to the amount of energy stored in the energy storage device, e.g. a temperature profile range of said thermal energy storage device, wherein the range is so selected that with any value related to the amount of energy stored in the energy storage device, e.g. any temperature in said range, the constraint energy flux can be supplied at each of said time instants and operating the energy storage device within said profile range at each of said time instants.

The profile, e.g. temperature profile of this method may be periodical having a predetermined period and the time frame may span at least half the period.

Other embodiments of the invention may be defined as follows:

A method of operating a system comprising an energy storage unit, e.g. a thermal, mechanical, chemical or electrical energy storage unit, an energy production unit and an energy dissipating unit, wherein the dissipating unit demands a flux of energy at multiple time instants, the demanded flux being supplied entirely by the system, the method comprising predetermining the portion of the demanded flux at a time instant which is supplied by the storage unit, wherein the predetermining step comprises calculating a cost for operating at least the storage unit and the production unit at said time instant and from said time instant till the end of a predetermined time frame and selecting the portion of demanded flux which minimises the cost for operating.

The cost for operating may be calculated for each value related to the amount of energy stored in the storage unit within the profile range, e.g. for each temperature within the temperature profile range of the thermal energy storage unit.

The cost for operating may be calculated for each portion of demanded flux that can be supplied by the energy storage unit.

The cost for operating may be calculated for each value of the demanded flux within a predetermined range of said demanded flux.

The step of calculating the cost for operating is carried out in advance for all values of one or more of the variables selected from the group consisting of: value related to the amount of energy stored in the storage unit, e.g. temperature of the storage unit, demanded flux and portion of demanded flux and for all time instants within the time frame and stored in a table and wherein the selecting step comprises looking up the portion of demanded flux in the table. This has the advantage that the complexity of the system at decision times is low as only values have to be looked up, e.g. in a look-up table.

The thermal energy storage device or the thermal energy storage unit may be an underground thermal energy storage system.

A device for storing energy, e.g. a thermal, mechanical, chemical or electrical energy storage device, comprising means for carrying out the method hereinabove defined.

A system comprising an energy storage unit, e.g. a thermal, mechanical, chemical or electrical energy storage unit, an energy production unit, e.g. a thermal, mechanical, chemical or electrical energy storage production unit, and an energy dissipating unit, e.g. a thermal, mechanical, chemical or electrical energy dissipating unit, wherein the system further comprises means for carrying out the method hereinabove defined.

The system may be a system for heating and air conditioning a building.

The invention claimed is:

1. A method of operating an energy supply system comprising an energy storage unit and an energy production unit, comprising the steps of:

predetermining a time frame in which the energy supply system will be functioning, calculating costs for operating the energy supply system in advance of operation for all time instants within the time frame and storing the calculated costs for each time instant in a table, the calculating of the costs for the table starting from assigning a terminal cost function which assigns a cost for operating the energy supply system to each of a plurality of values related to energy stored in the energy storage unit and stores the terminal cost function in the table, and then, working backwards in time from the terminal cost function, defining at each time interval optimal heat flux which gives a lowest cost for operating the energy supply system for every value related to the energy stored in the energy storage unit thus defining a new cost function at each time interval of the complete time frame and storing each new cost function in the table; and controlling and applying the amount of energy supplied by the energy storage unit so that at any time instant of the predetermined time frame, the energy storage unit is adapted to supply energy, wherein the step of controlling and applying the amount of energy supplied by the energy storage unit comprises:

selecting from the table the optimal amount of energy to be supplied by the energy storage unit defined by the cost function stored for each time instant which minimizes the cost for operating the energy supply system at each time interval and applying the selected optimal amount of energy from the table for controlling the operation of the energy storage unit for continuous operation of the energy storage unit during the predetermined time frame.

2. The method according to claim 1, wherein the cost for operating is calculated for each portion of demanded flux that can be supplied by the energy storage unit.

3. The method according to claim 1, wherein the cost for operating is calculated for each value of the demanded flux within a predetermined range of said demanded flux.

4. The method according to claim 1, wherein the step of calculating the cost for operating is carried out in advance for all time instants within the time frame and stored in a table and wherein the selecting step comprises looking up the portion of demanded flux in the table.

5. A method of operating an energy supply system comprising an energy storage unit and an energy production unit, comprising the steps of:
predetermining a time frame in which the energy supply system will be functioning, wherein costs for operating the energy supply system are calculated in advance of operation for all time instants within the time frame and stored, by starting with assigning a terminal cost function which assigns a cost for operating the energy supply system to each of a plurality of values related to the energy stored in the energy storage unit and, working backwards in time from the terminal cost function, defining and storing at each time interval an optimal heat flux which gives a lowest cost for operating the energy supply system for every value related to the energy stored in the energy storage unit thus defining a new cost function at each time interval of the complete time frame; and
controlling and applying the amount of energy supplied by the energy storage unit by selecting control parameters associated with the lowest cost so that at any time instant of the predetermined time frame, the energy storage unit is configured to supply energy,
wherein the selected control parameters are applied to control the operation of the energy storage unit for continuous operation of the energy storage unit during the predetermined time frame,
wherein the energy storage unit is an underground thermal energy storage system.

6. The method according to claim 5, wherein said time frame is the year round.

7. A controller adapted to operate an energy supply system comprising an energy storage unit and an energy production unit, the controller being configured to carry out a method of operating an energy supply system comprising an energy storage unit and an energy production unit, comprising the steps of:
predetermining a time frame in which the energy supply system will be functioning, wherein costs for operating the energy supply system are calculated in advance of operation for all time instants within the time frame and stored, by starting from assigning a terminal cost function which assigns a cost for operating the energy supply system to a plurality of values related to the energy stored in the energy storage unit and, working backwards in time from the terminal cost function, defining and storing at each time interval an optimal heat flux which gives a lowest cost for operating the energy supply system for every value related to the energy stored in the energy storage unit thus defining a new cost function at each time interval of the complete time frame; and
controlling and applying the amount of energy supplied by the energy storage unit by selecting control parameters associated with the lowest cost defined by the cost function so that at any time instant of the predetermined time frame, the energy storage unit is adapted to supply energy,
wherein the selected control parameters are applied to control the operation of the energy storage unit for continuous operation of the energy storage unit during the predetermined time frame.

8. The controller according to claim 7, wherein the system is a system for heating and/or air conditioning a building.

9. The controller according to claim 7, wherein the system is a system for providing power to a vehicle.

10. A method of operating, over a time frame, an energy supply system comprising an energy production unit and an energy storage unit, the method comprising, at time instants in the time frame:
selecting the energy flux to be removed from the energy storage unit by calculating and storing costs for operating the energy supply system in advance of operation for all time instants within the time frame, by starting from assigning a terminal cost function which assigns a cost for operating the energy supply system to each of a plurality of values related to the energy stored in the energy storage unit and, working backwards in time from the terminal cost function, defining and storing at each time interval an optimal heat flux which gives the lowest cost for operating the energy supply system for every value related to the energy stored in the energy storage unit thus defining and storing a new cost function at each time interval of the complete time frame;
selecting at any time instant an optimal amount of energy supplied by the energy storage unit which minimizes the cost for operating the energy supply system defined by the cost function;
applying the selected optimal amount of energy for controlling the operation of the energy storage unit for continuous operation of the energy storage unit during all time instants in the time frame; and
extracting the selected energy flux from the energy storage unit.

11. The method according to claim 10, wherein the system is a system for heating and/or air conditioning a building.

12. The method according to claim 10, wherein the energy storage unit is a thermal energy storage system.

13. The method according to claim 10, wherein the indication of the energy contained within the energy storage unit is the temperature of the thermal energy storage system.

14. A method of operating, over a time frame, an energy supply system comprising an energy production unit and an energy storage unit, the method comprising, at time instants in the time frame:
selecting the energy flux to be removed from the energy storage unit by calculating and storing costs for operating the energy supply system in advance of the operation for all time instants within the time frame, by starting from assigning a terminal cost function which assigns a cost for operating the energy supply system to each of a plurality of values related to the energy stored in the energy storage unit and, working backwards in time from the terminal cost function, defining and storing at each time interval an optimal heat flux which gives the lowest cost for operating the supply system for every value related to the energy stored in the energy storage unit thus defining and storing a new cost function at each time interval of the complete time frame;

selecting the optimal amount of energy supplied by the storage unit which minimizes the cost for operating the energy supply system at any time instant;

applying the selected optimal amount of energy for controlling the operation of the energy storage unit for continuous operation of the energy storage unit during all time instants in the time frame; and extracting the selected energy flux from the energy storage unit, wherein the energy storage unit is a thermal energy storage system and the energy storage unit is an underground thermal energy storage system.

15. The method according to claim 14, wherein said time frame is the year round.

16. A controller adapted to operate, over a time frame, an energy supply system comprising an energy storage unit and an energy production unit so as to, at time instants in the time frame:

select the energy flux to be removed from the energy storage unit by selecting the optimal amount of energy to be supplied by the storage unit which minimizes the cost for operating the energy supply system as defined by a cost function calculated and stored for each time instant, and applying the selected optimal amount of energy for controlling the operation of the energy storage unit for continuous operation of the energy storage unit during all time instants in the time frame, wherein an optimal amount of energy is calculated in advance by calculating and storing costs for operating the energy supply system in advance of operation for all time instants within the time frame by starting from assigning a terminal cost function which assigns a cost for operating the energy supply system to each of a plurality of values related to the energy stored in the energy storage unit at each time instant and, working backwards in time from the terminal cost function, at each time interval defining and storing an optimal heat flux which gives the lowest cost for operating the energy supply system for every value related to the energy stored in the energy storage unit at each time instant thus defining a new cost function at each time interval of the complete time frame.

* * * * *